(12) United States Patent
Kibbar et al.

(10) Patent No.: US 11,670,120 B2
(45) Date of Patent: Jun. 6, 2023

(54) SYSTEM AND METHOD FOR MONITORING TEST DATA FOR AUTONOMOUS OPERATION OF SELF-DRIVING VEHICLES

(71) Applicant: TOYOTA RESEARCH INSTITUTE, INC., Los Altos, CA (US)

(72) Inventors: Amir J. Kibbar, Livermore, CA (US); Shenghui Sun, Redwood City, CA (US); Yung-Jin Hu, Fremont, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 262 days.

(21) Appl. No.: 17/007,648

(22) Filed: Aug. 31, 2020

(65) Prior Publication Data
US 2022/0068050 A1 Mar. 3, 2022

(51) Int. Cl.
| | |
|---|---|
| *G06N 20/00* | (2019.01) |
| *G06F 11/36* | (2006.01) |
| *G07C 5/08* | (2006.01) |
| *G07C 5/00* | (2006.01) |
| *G05D 1/02* | (2020.01) |
| *G01M 17/007* | (2006.01) |

(52) U.S. Cl.
CPC ......... *G07C 5/0808* (2013.01); *G05D 1/0221* (2013.01); *G06F 11/3616* (2013.01); *G06N 20/00* (2019.01); *G07C 5/008* (2013.01); *G07C 5/0841* (2013.01)

(58) Field of Classification Search
CPC .... G07C 5/0808; G07C 5/008; G07C 5/0841; G05D 1/0221; G06F 11/3616; H04L 67/12
See application file for complete search history.

(56) References Cited

U.S. PATENT DOCUMENTS

| | | | | |
|---|---|---|---|---|
| 10,118,628 B2* | 11/2018 | Lundsgaard | .......... | B60W 10/20 |
| 10,255,168 B2* | 4/2019 | Stefan | ................. | G06F 11/3604 |
| 10,496,766 B2* | 12/2019 | Levinson | ................ | G06F 30/20 |
| 10,884,902 B2* | 1/2021 | Kislovskiy | .......... | G06F 11/0706 |

(Continued)

FOREIGN PATENT DOCUMENTS

| | | |
|---|---|---|
| CN | 108492603 A | 9/2018 |
| CN | 110210806 A | 9/2019 |

(Continued)

OTHER PUBLICATIONS

Author Unknown, "Big Data in Automotive Development", URL: https://www.t-systems.com/en/perspectives/big-data/data-analysis-1/automobile-905186, accessed May 21, 2020.

*Primary Examiner* — Vivek D Koppikar
*Assistant Examiner* — Kathleen B Ward
(74) *Attorney, Agent, or Firm* — Seyfarth Shaw LLP

(57) ABSTRACT

A method for autonomous vehicle test data distribution and analysis is described. The method includes uploading driving session data from a computer of a drive site to a network attached storage of the drive site. The method also includes uploading the driving session data from the network attached storage of the drive site to a cloud-based storage location. The method further includes distributing the driving session data from the cloud-based storage location and a work unit to at least one research site separate from the drive site. The method also includes processing, by the at least one research site, the driving session data according to an analysis/processing task associated with the work unit.

15 Claims, 6 Drawing Sheets

(56) References Cited

U.S. PATENT DOCUMENTS

| | | | |
|---|---|---|---|
| 11,206,465 B1* | 12/2021 | Krotosky | H04Q 9/02 |
| 11,375,034 B2* | 6/2022 | Hayes | H04L 67/12 |
| 2011/0231546 A1* | 9/2011 | Nathanson | H04L 41/0213 |
| | | | 709/224 |
| 2018/0194305 A1* | 7/2018 | Reed | B60W 50/14 |
| 2018/0342113 A1* | 11/2018 | Kislovskiy | G07C 5/008 |
| 2019/0047493 A1 | 2/2019 | Chierichetti et al. | |
| 2019/0101914 A1* | 4/2019 | Coleman, II | G08G 1/0104 |
| 2019/0263417 A1* | 8/2019 | Rau | B60W 40/12 |
| 2020/0202730 A1* | 6/2020 | Nayak | G08G 5/045 |
| 2020/0208995 A1* | 7/2020 | Hou | G01C 21/3881 |
| 2020/0250067 A1* | 8/2020 | Walther | G06F 11/3013 |
| 2020/0364953 A1* | 11/2020 | Simoudis | G06N 5/022 |
| 2021/0011908 A1* | 1/2021 | Hayes | G06N 20/00 |
| 2021/0407224 A1* | 12/2021 | Ahearne | H04W 4/46 |
| 2022/0126864 A1* | 4/2022 | Moustafa | B60W 60/0057 |

FOREIGN PATENT DOCUMENTS

| | | | |
|---|---|---|---|
| CN | 110460635 A | 11/2019 | |
| CN | 110928658 A | 5/2020 | |

\* cited by examiner

SYSTEM AND METHOD FOR MONITORING TEST DATA FOR AUTONOMOUS OPERATION OF SELF-DRIVING VEHICLES

BACKGROUND

Field

Certain aspects of the present disclosure generally relate to machine learning and, more particularly, to a system and method for monitoring test data from autonomous operation of self-driving vehicles.

Background

Autonomous agents, such as self-driving cars and robots, are quickly evolving. Self-driving cars rely on various ways of perceiving an environment. Unfortunately, the various ways used by self-driving cars to perceive a surrounding environment are not entirely reliable. In addition, because self-driving cars have to interact with other vehicles, many critical concerns arise. For example, one critical concern is how to design vehicle control of an autonomous vehicle using machine learning.

Unfortunately, vehicle control by machine learning may be ineffective in situations involving complex interactions between vehicles (e.g., a situation where a controlled (ego) vehicle merges into a traffic lane). Machine learning techniques for vehicle control by selecting an appropriate vehicle control action of an ego vehicle are desired. For example, a selected speed/acceleration/steering angle of the controlled (ego) vehicle may be applied as a vehicle control action. An autonomous test vehicle may operate according to selected vehicle control actions. Unfortunately, a test autonomous vehicle generates a significant amount (e.g., 100 gigabytes (GBs)) of data during a test run. A system and method for accessing this test data at different research locations is desired.

SUMMARY

A method for autonomous vehicle test data distribution and analysis is described. The method includes uploading driving session data from a computer of a drive site to a network attached storage of the drive site. The method also includes uploading the driving session data from the network attached storage of the drive site to a cloud-based storage location. The method further includes distributing the driving session data from the cloud-based storage location and a work unit to at least one research site separate from the drive site. The method also includes processing, by the at least one research site, the driving session data according to an analysis/processing task associated with the work unit.

A non-transitory computer-readable medium having program code recorded thereon for autonomous vehicle test data distribution and analysis is described. The program code is executed by a processor. The non-transitory computer-readable medium includes program code to upload driving session data from a computer of a drive site to a network attached storage of the drive site. The non-transitory computer-readable medium also includes program code to upload the driving session data from the network attached storage of the drive site to a cloud-based storage location. The non-transitory computer-readable medium further includes program code to distribute the driving session data from the cloud-based storage location and a work unit to at least one research site separate from the drive site. The non-transitory computer-readable medium also includes program code to process, by the at least one research site, the driving session data according to an analysis/processing task associated with the work unit.

A system for autonomous vehicle test data distribution and analysis is described. The system includes a drive site composed of a network attached storage and a computer. The computer is configured to upload driving session data from the computer of the drive site to the network attached storage in response to insertion of a session data memory module of a test vehicle. The network attached storage is configured to upload the driving session data from the network attached storage of the drive site to a cloud-based storage location. The cloud-based storage location of the system is configured to distribute the driving session data and a work unit to research sites separate from the drive site. At least two of the researches sites are configured to process the driving session data according to an analysis/processing task associated with the work unit received by the two of the research sites, respectively.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
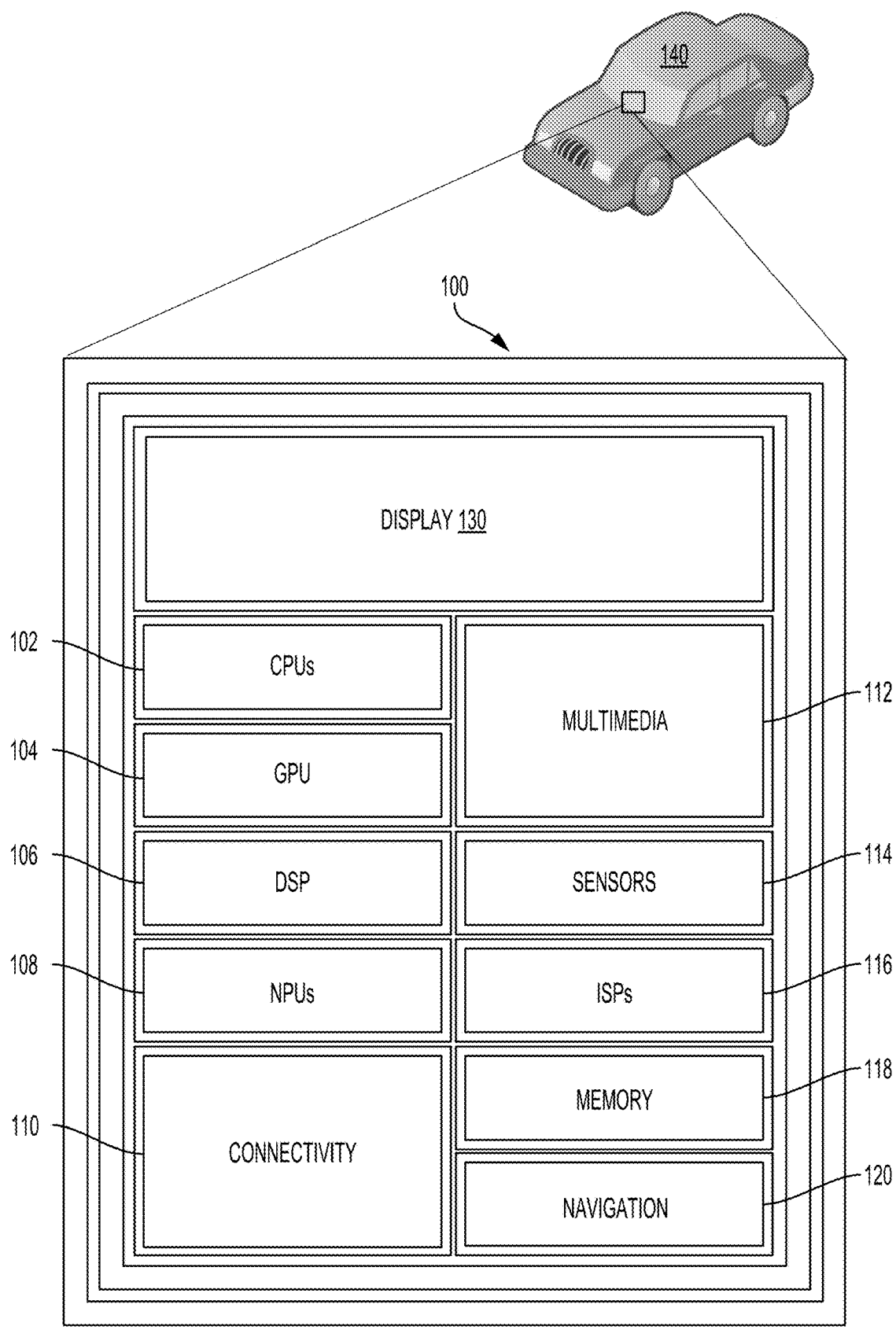
FIG. 1 illustrates an example implementation of designing a neural network using a system-on-a-chip (SOC) of an autonomous vehicle test data distribution and analysis system, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks, and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Autonomous agents, such as self-driving cars and robots, are quickly evolving. Self-driving cars rely on various ways of perceiving an environment. Unfortunately, the various ways used by self-driving cars to perceive a surrounding environment are not entirely reliable. In addition, because self-driving cars have to interact with other vehicles, many critical concerns arise. For example, one critical concern is how to test vehicle control of an autonomous vehicle using machine learning.

Automation of vehicle control on highways is rapidly advancing. These automated vehicles are expected to reduce traffic accidents and improve traffic efficiency. In particular, machine learning techniques for vehicle control by selecting an appropriate vehicle control action of an ego vehicle are desired. For example, a selected speed/acceleration/steering angle of the controlled (ego) vehicle may be applied as a vehicle control action. Unfortunately, vehicle control by machine learning may be ineffective in situations involving complex interactions between vehicles (e.g., a situation where a controlled (ego) vehicle merges into a traffic lane).

In particular, safety is a critical concern when building autonomous agents that operate in human environments. For autonomous driving in particular, safety is a formidable challenge due to high speeds, rich environments, and complex dynamic interactions with many traffic participants, including vulnerable road users. Testing and verification of machine learning techniques for vehicle control by selecting an appropriate vehicle control action of an ego vehicle are desired. For example, an autonomous test vehicle may operate according to selected vehicle control actions. Unfortunately, a test autonomous vehicle generates a significant amount of data.

For example, a test autonomous vehicle generates a significant amount (e.g., 100 gigabytes (GBs)) of data during a test run. Transmitting such a large amount of data is difficult and costly. Furthermore, storing the data in a cloud-based storage for use by researchers may be impractical because of the significant amount of time it takes to download and/or process the data according to the researcher's needs. Thus, the data should ideally be located close to the researcher. A system and method for accessing this test data at different research locations is desired.

Aspects of the present disclosure are directed to a system and method for monitoring the status of test data at various memory storage locations and running tasks on the test data. Aspects of the present disclosure provide a test data pipeline that distributes relevant data from test autonomous vehicles to researcher locations for expedited use by researchers. A test method begins when a test autonomous vehicle completes a test run and enters a garage. In this example, a sensor data memory module is removed from the test autonomous vehicle and is inserted into a computer at the garage.

In this aspect of the present disclosure, the sensor data is provided to a cloud-based storage location and is removed from the source site (e.g., the garage of the test autonomous vehicle). The raw sensor data may be stored at the cloud-based storage location. Additionally, any non-relevant information may be removed from the sensor data; however, a full non-filtered version of the sensor data remains at the cloud-based storage location. The filtered information is then provided to a processing pipeline, which acts as a distributed computing network. This aspect of the present disclosure is directed to the ability of gathering and quickly distributing autonomous vehicle test data in a data pipeline so that it is readily available to researchers.

According to this aspect of the present disclosure, the processing pipeline enables each researcher (or research site) to receive the sensor data as well as processing units. That is, researchers receive the information as well as contribute processing power to process the sensor data on ingestion. Processing (e.g., work) units may correspond with particular analysis or processing tasks. For example, one research location may be responsible for indexing the sensor data, making the sensor data compatible with keyword searching. Thus, an assigned work unit may be processing the sensor data for indexing. Another research location may be responsible for performing machine learning tasks on the sensor data. Once the research location completes the work unit, the output is then pushed to the cloud-based storage location as well as other research locations that may use the output.

FIG. 1 illustrates an example implementation of the aforementioned system and method for an autonomous vehicle test data distribution and analysis system using a system-on-a-chip (SOC) 100 of a vehicle vision system for an autonomous vehicle 140. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, select a certified vehicle control action, according to the display 130 illustrating a view of a vehicle.

In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system. The SOC 100 may be based on an Advanced Risk Machine (ARM) instruction set or the like. In another aspect of the present disclosure, the SOC 100 may be a server computer in communication with the autonomous vehicle 140. In this arrangement, the autonomous vehicle 140 may include a processor and other features of the SOC 100.

In this aspect of the present disclosure, instructions loaded into a processor (e.g., CPU 102) or the NPU 108 of the autonomous vehicle 140 may include code to upload driving session data, based on an images captured by the sensor processor 114, from a computer of a drive site to a network attached storage of the drive site. The instructions loaded into a processor (e.g., CPU 102) may also include code to upload the driving session data from the network attached storage of the drive site to a cloud-based storage location in response to the images captured by the sensor processor 114. The instructions loaded into a processor (e.g., CPU 102) may also include code for to distribute the driving session data from the cloud-based storage location and a work unit to at least one research site separate from the drive site. The instructions loaded into a processor (e.g., CPU 102) may also include code for to process, by the at least one research site, the driving session data according to an analysis/processing task associated with the work unit.

Figure 2:
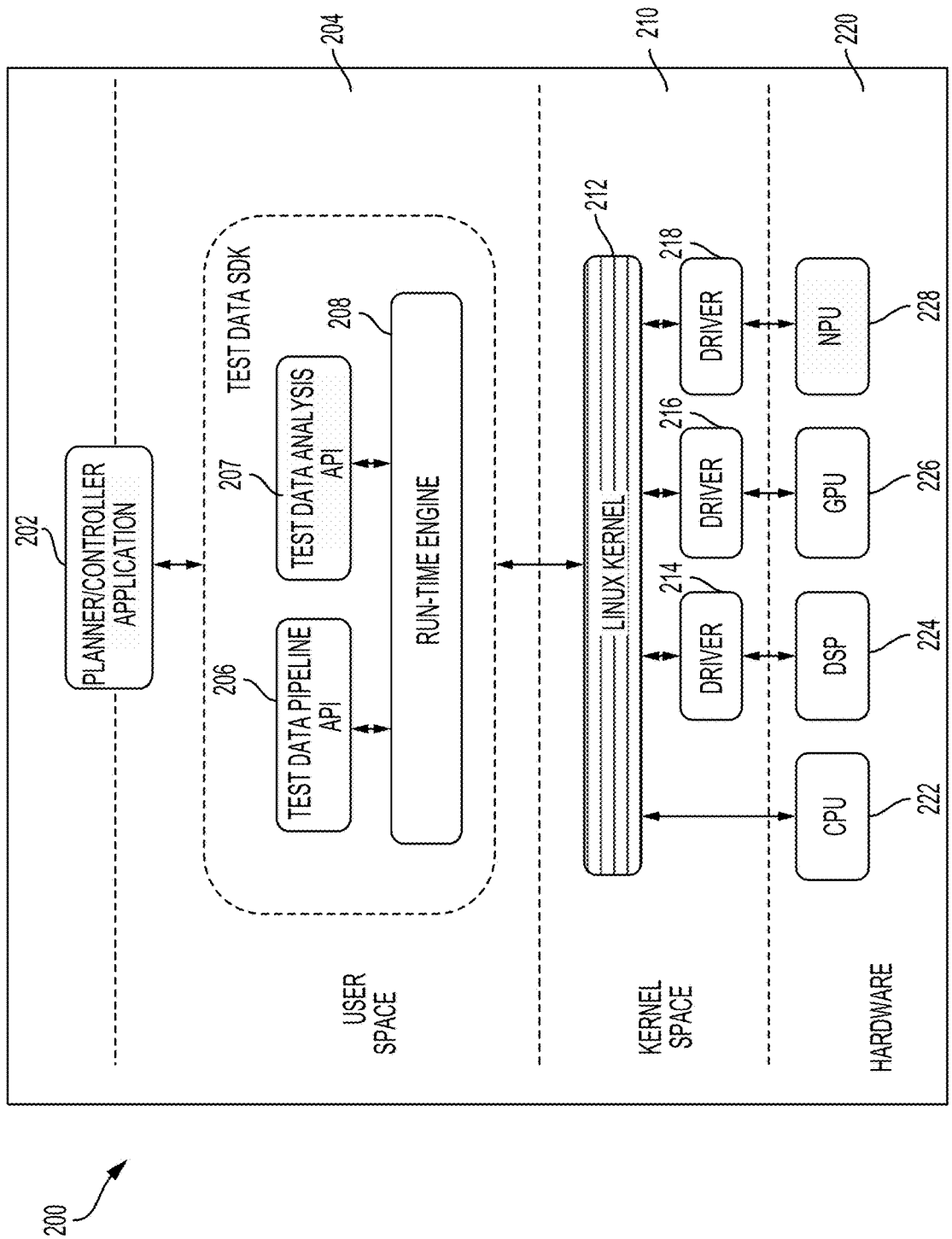
FIG. 2 is a block diagram illustrating an exemplary software architecture that may modularize artificial intelligence (AI) functions for an autonomous vehicle test data distribution and analysis system, according to aspects of the present disclosure.

FIG. 2 is a block diagram illustrating a software architecture 200 that may modularize artificial intelligence (AI) functions for an autonomous vehicle test data distribution and analysis system, according to aspects of the present disclosure. Using the architecture, a planner/controller application 202 may be designed such that it may cause various processing blocks of an SOC 220 (for example a CPU 222, a DSP 224, a GPU 226, and/or an NPU 228) to perform supporting computations during run-time operation of the planner/controller application 202. While FIG. 2 describes the software architecture 200 for autonomous vehicle test data distribution and analysis, it should be recognized that the vehicle test data distribution and analysis is not limited to autonomous agents. According to aspects of the present disclosure, vehicle test data distribution and analysis functionality is applicable to any vehicle type.

The planner/controller application 202 may be configured to call functions defined in a user space 204 that may, for example, provide for vehicle test data distribution and analysis services. The planner/controller application 202 may make a request for compiled program code associated with a library defined in a test data pipeline application programming interface (API) 206. The test data pipeline API 206 is configured for distributing test sensor data to a cloud-based storage location and removing the test data from a source site (e.g., the garage of a test autonomous vehicle) provided to the test data pipeline API 206. In response, compiled code of a test data analysis API 207 enables each researcher (or research site) to receive the sensor data as well as processing units. That is, researchers receive the information as well as contribute processing power to process the sensor data on ingestion. Processing (e.g., work) units may correspond with particular analysis or processing tasks according to the test data analysis API 207.

A run-time engine 208, which may be compiled code of a runtime framework, may be further accessible to the planner/controller application 202. The planner/controller application 202 may cause the run-time engine 208, for example, to take actions for vehicle test data distribution and analysis of sensor data from a test autonomous vehicle. When an ego vehicle encounters a safety situation, the run-time engine 208 may in turn send a signal to an operating system 210, such as a Linux Kernel 212, running on the SOC 220. FIG. 2 illustrates the Linux Kernel 212 as software architecture for autonomous vehicle test data distribution and analysis. It should be recognized, however, that aspects of the present disclosure are not limited to this exemplary software architecture. For example, other kernels may provide the software architecture to support autonomous vehicle test data distribution and analysis functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

The growing complexity of software in autonomous vehicles makes it more difficult to ensure reliability of these autonomous vehicles. For example, the risk of unexpected catastrophic failures remains, although aggregate safety measures are improved. In particular, safety is a critical concern when building autonomous agents that operate in human environments. For autonomous driving in particular, safety is a formidable challenge due to high speeds, rich environments, and complex dynamic interactions with many traffic participants, including vulnerable road users. Testing and verification of machine learning techniques for vehicle control by selecting an appropriate vehicle control action of an ego vehicle are desired. For example, an autonomous test vehicle may operate according to selected vehicle control actions. Unfortunately, a test autonomous vehicle generates a significant amount of data.

For example, a test autonomous vehicle generates a significant amount (e.g., 100 gigabytes (GBs)) of data during a test run. Transmitting such a large amount of data is difficult and costly. Furthermore, storing the data in a cloud-based storage for use by researchers may be impractical because of the significant amount of time it takes to download and/or process the data according to the researcher's needs. Thus, the data should ideally be located close to the researcher. A system and method for accessing this test data at different research locations is desired.

Aspects of the present disclosure are directed to a system and method for monitoring the status of test data at various memory storage locations and running tasks on the test data. Aspects of the present disclosure provide a test data pipeline that distributes relevant data from test autonomous vehicles to researcher locations for expedited use by researchers. A test method begins when a test autonomous vehicle completes a test run and enters a garage. In this example, a sensor data memory module is removed from the test autonomous vehicle and is inserted into a computer at the garage.

According to this aspect of the present disclosure, the processing pipeline enables each researcher (or research site) to receive the sensor data as well as processing units. That is, researchers receive the information as well as contribute processing power to process the sensor data on ingestion. Processing (e.g., work) units may correspond with particular analysis or processing tasks. For example, one research location may be responsible for indexing the sensor data, making the sensor data compatible with keyword searching. Thus, an assigned work unit may be processing the sensor data for indexing. Another research location may be responsible for performing machine learning tasks on the sensor data. Once the research location completes the work unit, the output is then pushed to the cloud-based storage location as well as other research locations that may use the output.

Figure 3:
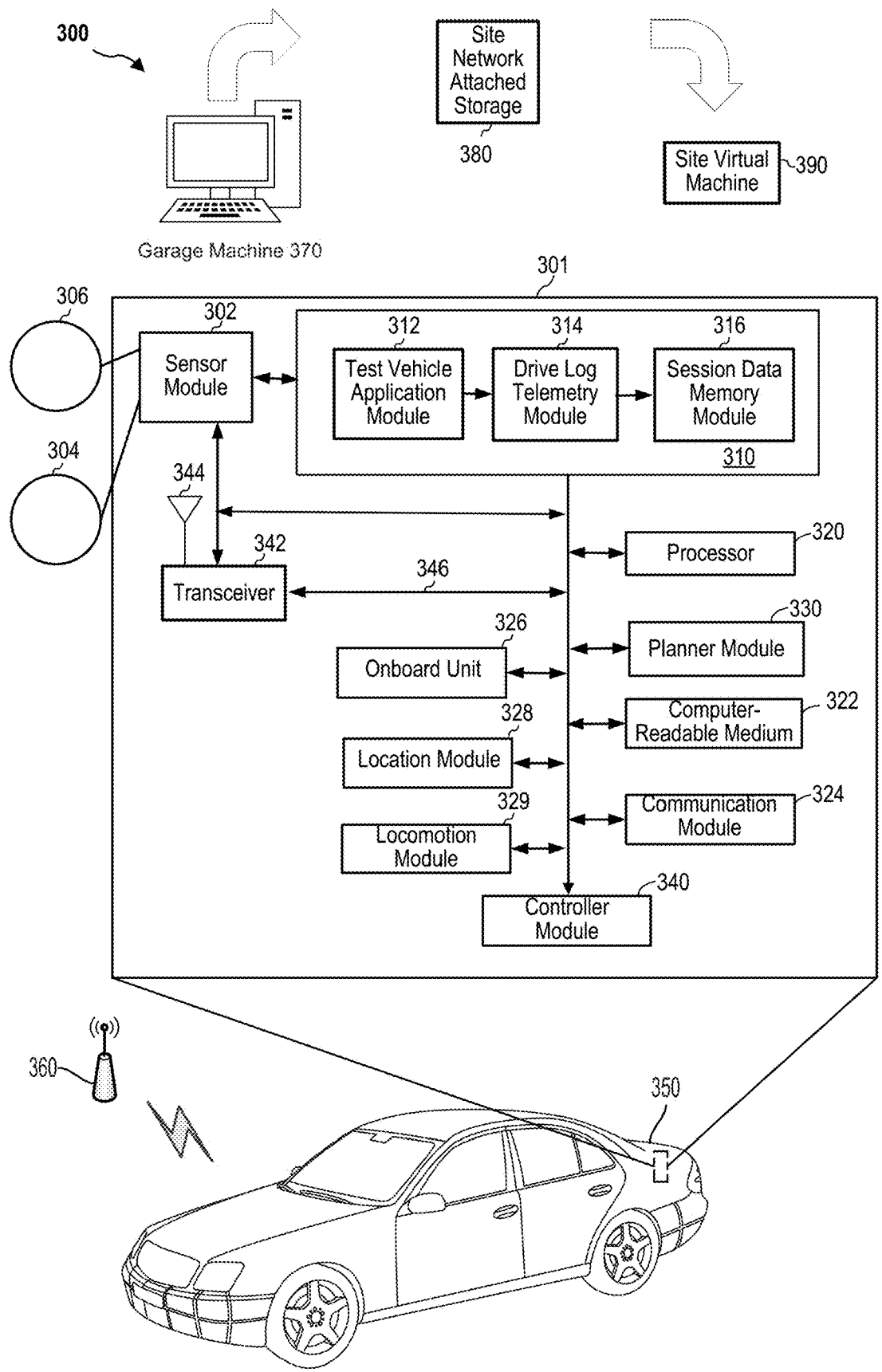
FIG. 3 is a diagram illustrating a hardware implementation for an autonomous vehicle test data distribution and analysis system, according to aspects of the present disclosure.

FIG. 3 is a diagram illustrating a hardware implementation for an autonomous vehicle test data distribution and analysis system 300, according to aspects of the present disclosure. The autonomous vehicle test data distribution and analysis system 300 may be configured for improving testing of an ego vehicle by using distributed analysis and processing of driving test session data from an origin site. The autonomous vehicle test data distribution and analysis system 300 includes a test agent control system 301, which may be a component of a vehicle, a robotic device, or other non-autonomous device (e.g., non-autonomous vehicles, ride-share cars, etc.). For example, as shown in FIG. 3, the test agent control system 301 is a component of a test autonomous vehicle 350. Aspects of the present disclosure are not limited to the test agent control system 301 being a component of the test autonomous vehicle 350. Other devices, such as a bus, motorcycle, or other like non-autonomous vehicle, are also contemplated for implementing the test agent control system 301. In this example, the test autonomous vehicle 350 may be autonomous or semi-autonomous; however, other configurations for the test autonomous vehicle 350 are contemplated.

The test agent control system 301 may be implemented with an interconnected architecture, represented generally by an interconnect 346. The interconnect 346 may include any number of point-to-point interconnects, buses, and/or bridges depending on the specific application of the test agent control system 301 and the overall design constraints. The interconnect 346 links together various circuits including one or more processors and/or hardware modules, represented by a sensor module 302, a vehicle perception module 310, a processor 320, a computer-readable medium 322, a communication module 324, an onboard unit 326, a location module 328, a locomotion module 329, a planner module 330, and a controller module 340. The interconnect 346 may also link various other circuits such as timing sources, peripherals, voltage regulators, and power management circuits, which are well known in the art, and therefore, will not be described any further.

The test agent control system 301 includes a transceiver 342 coupled to the sensor module 302, the vehicle perception module 310, the processor 320, the computer-readable medium 322, the communication module 324, the onboard unit 326, the location module 328, the locomotion module 329, the planner module 330, and the controller module 340. The transceiver 342 is coupled to an antenna 344. The transceiver 342 communicates with various other devices over a transmission medium. For example, the transceiver 342 may receive commands via transmissions from a user or a connected vehicle. In this example, the transceiver 342 may receive/transmit information for the vehicle perception module 310 to/from connected vehicles within the vicinity of the test autonomous vehicle 350.

The test agent control system 301 includes the processor 320 coupled to the computer-readable medium 322. The processor 320 performs processing, including the execution of software stored on the computer-readable medium 322 to provide functionality according to the present disclosure. The software, when executed by the processor 320, causes the test agent control system 301 to perform the various functions described for autonomous vehicle test data distribution and analysis for the test autonomous vehicle 350, or any of the modules (e.g., 302, 310, 324, 328, 329, 330, and/or 340). The computer-readable medium 322 may also be used for storing data that is manipulated by the processor 320 when executing the software.

The sensor module 302 may obtain measurements via different sensors, such as a first sensor 306 and a second sensor 304. The first sensor 306 may be a vision sensor (e.g., a stereoscopic camera or a red-green-blue (RGB) camera) for capturing 2D images. The second sensor 304 may be a ranging sensor, such as a light detection and ranging (LIDAR) sensor or a radio detection and ranging (RADAR) sensor. Of course, aspects of the present disclosure are not limited to the aforementioned sensors as other types of sensors (e.g., thermal, sonar, and/or lasers) are also contemplated for either of the first sensor 306 or the second sensor 304.

The measurements of the first sensor 306 and the second sensor 304 may be processed by the processor 320, the sensor module 302, the vehicle perception module 310, the communication module 324, the onboard unit 326, the location module 328, the locomotion module 329, the planner module 330, and/or the controller module 340. In conjunction with the computer-readable medium 322, the measurements of the first sensor 306 and the second sensor 304 are processed to implement the functionality described herein. In one configuration, the data captured by the first sensor 306 and the second sensor 304 may be transmitted to a connected vehicle via the transceiver 342. The first sensor 306 and the second sensor 304 may be coupled to the test autonomous vehicle 350 or may be in communication with the test autonomous vehicle 350.

The location module 328 may determine a location of the test autonomous vehicle 350. For example, the location module 328 may use a global positioning system (GPS) to determine the location of the test autonomous vehicle 350. The location module 328 may implement a dedicated short-range communication (DSRC)-compliant GPS unit. A DSRC-compliant GPS unit includes hardware and software to make the test autonomous vehicle 350 and/or the location module 328 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

The communication module 324 may facilitate communications via the transceiver 342. For example, the communication module 324 may be configured to provide communication capabilities via different wireless protocols, such as 5G new radio (NR), Wi-Fi, long term evolution (LTE), 4G, 3G, etc. The communication module 324 may also communicate with other components of the test autonomous vehicle 350 that are not modules of the test agent control system 301. The transceiver 342 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

The test agent control system 301 also includes a planner module 330 for planning a route and a controller module 340 for controlling the locomotion of the test autonomous vehicle 350, via the locomotion module 329 for autonomous operation of the test autonomous vehicle 350. In one configuration, the controller module 340 may override a user input when the user input is expected (e.g., predicted) to cause a collision according to an autonomous level of the test autonomous vehicle 350. The modules may be software modules running in the processor 320, resident/stored in the computer-readable medium 322, and/or hardware modules coupled to the processor 320, or some combination thereof.

The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control ("ACC"); parking assistance with automated steering; and lane keeping assistance ("LKA") type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn his/her attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle ("HAV") is an autonomous vehicle that is Level 3 or higher. Accordingly, in some configurations the test autonomous vehicle 350 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The vehicle perception module 310 may be in communication with the sensor module 302, the processor 320, the computer-readable medium 322, the communication module 324, the onboard unit 326, the location module 328, the locomotion module 329, the planner module 330, the controller module 340, and the transceiver 342. In one configuration, the vehicle perception module 310 receives sensor data from the sensor module 302. The sensor module 302 may receive the sensor data from the first sensor 306 and the second sensor 304. According to aspects of the present disclosure, the sensor module 302 may filter the data to remove noise, encode the data, decode the data, merge the data, extract frames, or perform other functions. In an alternate configuration, the vehicle perception module 310 may receive sensor data directly from the first sensor 306 and the second sensor 304.

As shown in FIG. 3, the vehicle perception module 310 includes a test vehicle application module 312, a drive log telemetry module 314, and a session data memory module 316. The test vehicle application module 312 and the drive log telemetry module 314 may be components of a same or different artificial neural network, such as a deep convolutional neural network (CNN). The vehicle perception module 310 is not limited to a CNN. The vehicle perception module 310 receives a data stream from the first sensor 306 and/or the second sensor 304. The data stream may include a 2D RGB image from the first sensor 306 and LIDAR data points from the second sensor 304. The data stream may include multiple frames, such as image frames of a scene.

This configuration of the vehicle perception module 310 includes the test vehicle application module 312 (e.g., a driving stack) for operating the test autonomous vehicle 350 during a driving session. The driving session is cataloged with stored telemetry information by the drive log telemetry module 314 and sensor data from the sensor module 302, which are stored in the session data memory module 316, which is removable. In this example, the test agent control system 301 and the test autonomous vehicle 350 are associated with a site, including a garage machine 370, a site network attached storage (NAS) 380, and a site virtual machine 390, which are further illustrated in an ingestion process shown in FIG. 4.

Figure 4:
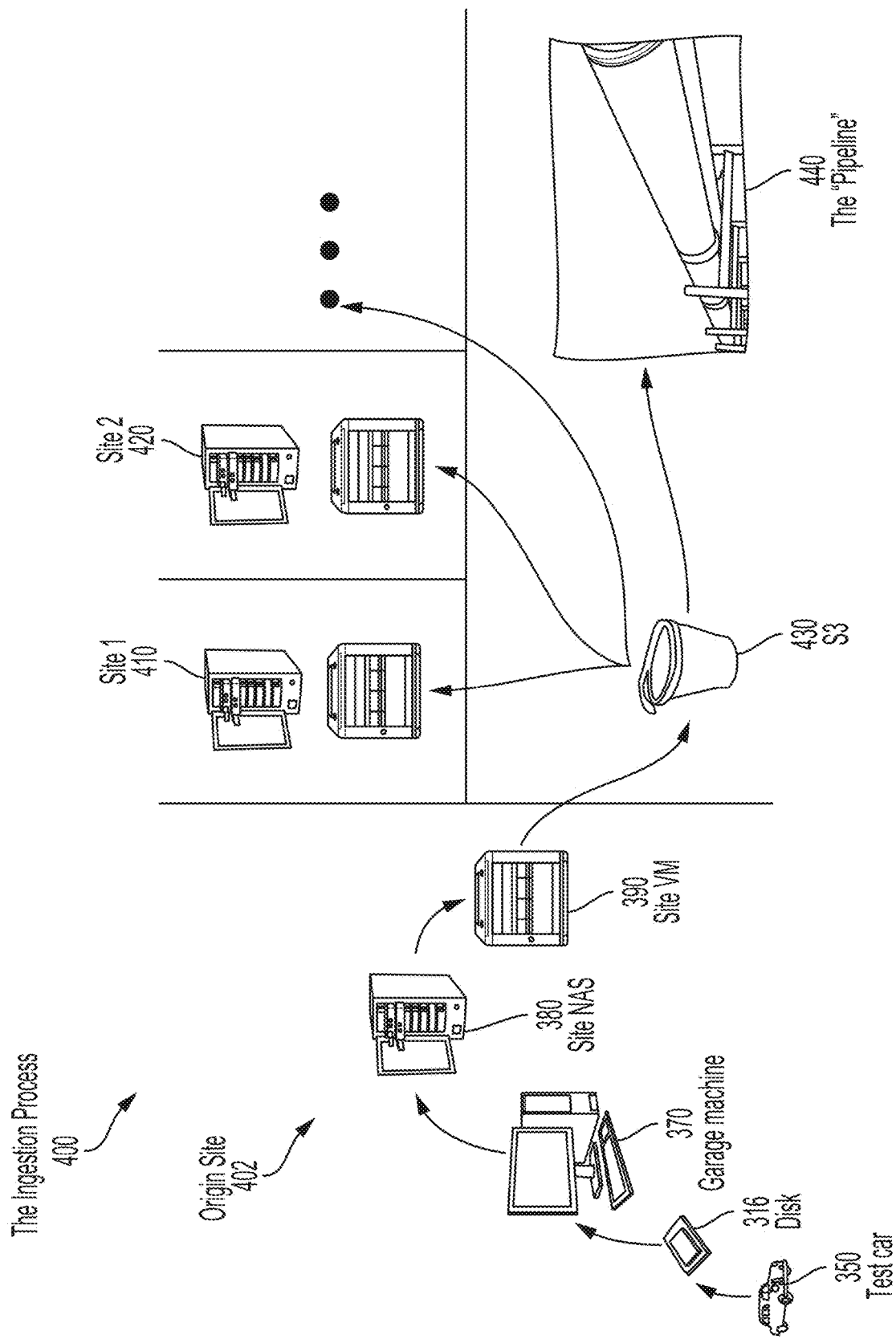
FIG. 4 is a diagram illustrating an ingestion process to enable a system and method for monitoring the status of test data at various memory storage locations and running tasks on the test data, according to aspects of the present disclosure.

FIG. 4 is a diagram illustrating an ingestion process 400 to enable a system and method for monitoring the status of test data at various memory storage locations and running tasks on the test data, according to aspects of the present disclosure. In this example, the ingestion process 400 begins when a test autonomous vehicle 350 completes a test run ("session") and enters a garage. In this example, the session data memory module 316 is removed from the test autonomous vehicle 350 and is inserted into a computer (e.g., the garage machine 370).

In this example, inserting the session data memory module 316 into the garage machine 370 triggers uploading of the session data from the garage machine 370 to the site NAS 380 of the origin site 402. In one configuration, uploading of the session data into the site NAS 380 triggers a message onto a session data queue, which is monitored by the site virtual machine 390. In response, the site virtual machine 390 uploads the session data from the origin site 402 (e.g., a drive site) data to a cloud-based storage location 430. In addition, the session data is removed from the origin site 402 (e.g., the garage machine 370 and/or the site NAS 380).

The raw session data may be stored at the cloud-based storage location 430. Additionally, any non-relevant information may be removed from the session data; however, a full non-filtered version of the session data remains at the cloud-based storage location 430. The filtered information may be provided to a data pipeline 440. The ingestion process 400 acts as a distributed computing network for distribution of the filtered information to research sites (e.g., Site 1, Site 2, etc.). This aspect of the present disclosure is directed to the ability of gathering and quickly distributing autonomous vehicle test data through the distributed computing network so that it is readily available to researchers at other sites (e.g., Site 1, Site 2, etc.).

The ingestion process 400 provides a test data distribution of relevant data from test autonomous vehicles to researcher locations for expedited use by the researchers. For example, test data distribution to a first research site 410 enables a researcher (or research site) to receive the session data as well as processing units. For example, the test data and processing unit distribution to a second research site 420 provides researchers with the test information, as well as processing units for contributing processing power to processing of the session data in response to the ingestion process 400.

Processing (e.g., work) units may correspond with particular analysis or processing tasks. For example, the first research site 410 may be responsible for indexing the session data, making the session data compatible for keyword searching within the network attached storage of the second research site 420. Thus, an assigned work unit may be processing the session data for indexing. The second research site 420 may be responsible for performing machine learning tasks on the session data. Once the research site completes the work unit, the output is then pushed to the cloud-based storage location 430 as well as other research locations that may use the output, such as the data pipeline 440.

Figure 5:
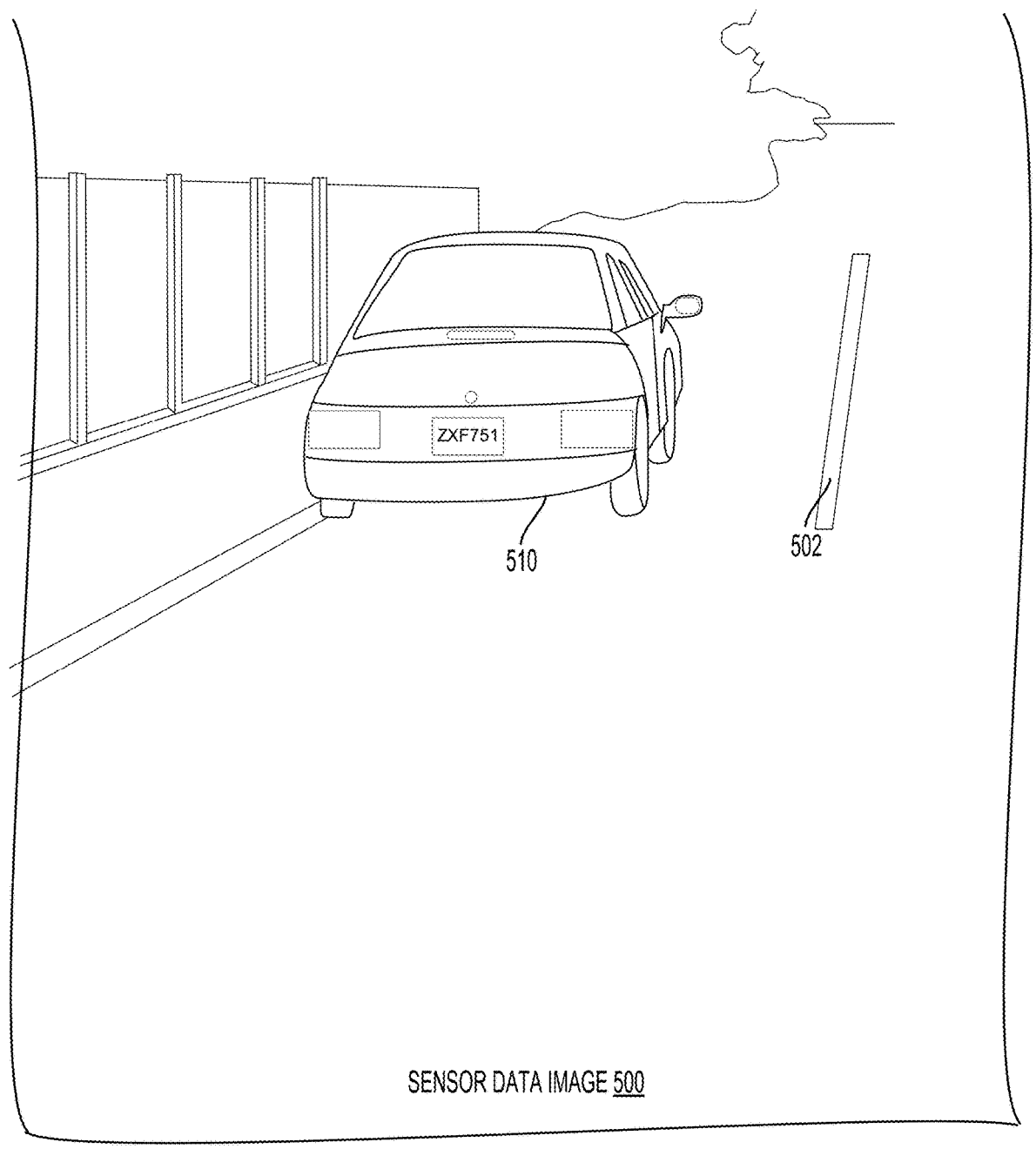
FIG. 5 illustrates a sensor data image captured by the test autonomous vehicle operating based on a driving stack (e.g., the test vehicle application module), according to aspects of the present disclosure.

FIG. 5 illustrates a sensor data image 500 captured by the test autonomous vehicle 350 to operate based on a driving stack (e.g., the test vehicle application module 312), according to aspects of the present disclosure. To illustrate operation of the test autonomous vehicle 350, consider a simple scenario shown by the sensor data image 500 of the test autonomous vehicle 350 driving on a straight segment of a highway 502.

In this example, the vehicle perception module 310 determines (e.g., using LIDAR) the only obstacle ahead of the test autonomous vehicle 350 is a lead car 510 traveling in the same direction and at a distance of 100 meters away. The test autonomous vehicle 350 is driving towards the lead car 510 at a speed of 10 meters per second (m/s), and can decelerate at a rate of 5 meters per second squared (m/s$^2$). This implies a stopping distance of 10 meters, which would rise to 40 meters if the speed were doubled. The controller module 340 may propose a vehicle control action of increasing a speed of the ego vehicle to 20 m/s. This sensor data captured during this test driving session, as well as telemetry information captured by the drive log telemetry module 314 (e.g., using an inertial measurement unit (IMU), is stored in the session data module for subsequent processing according to the ingestion process shown in FIG. 4.

Figure 6:
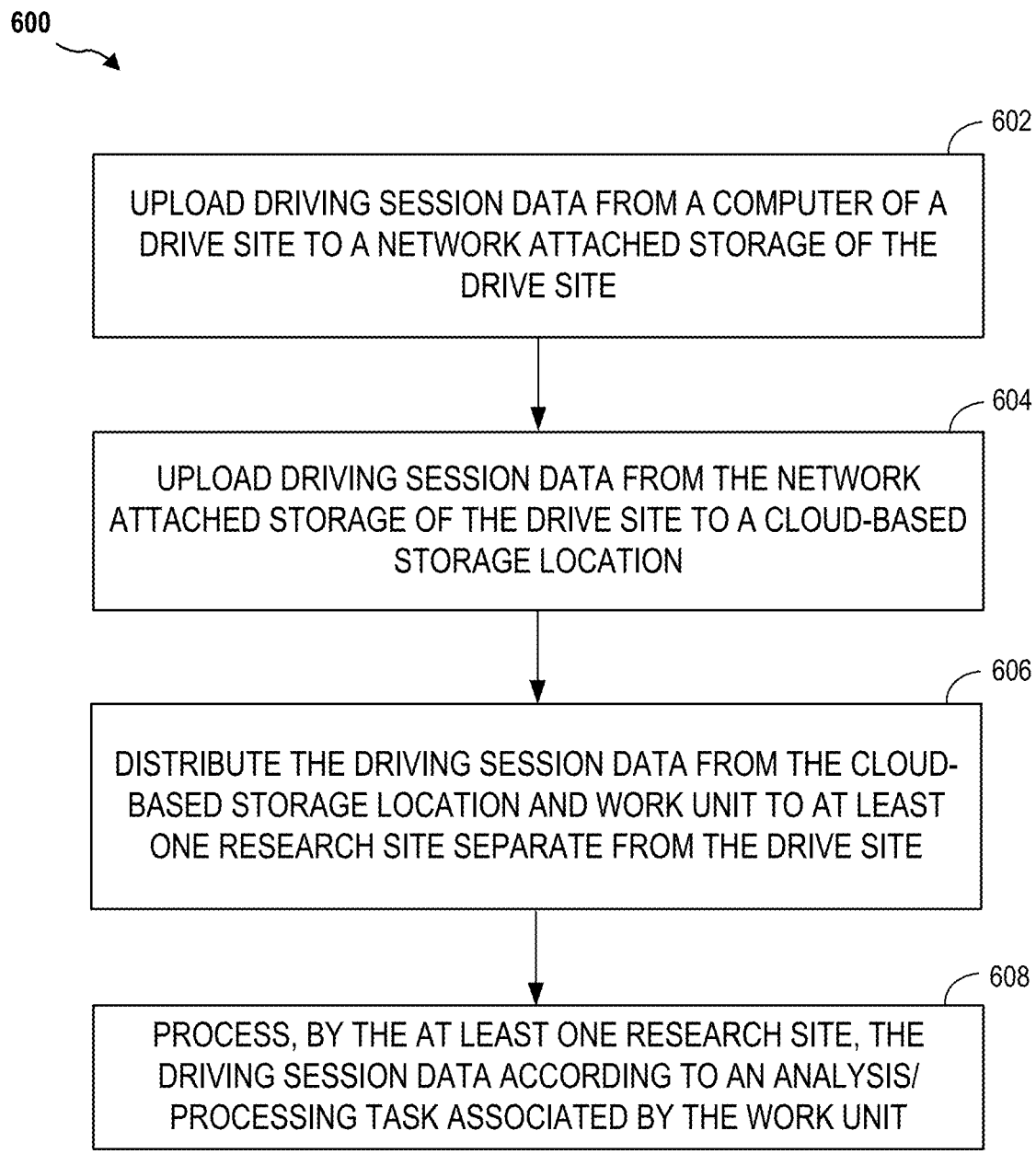
FIG. 6 is a flowchart illustrating a method for autonomous vehicle test data distribution and analysis, according to aspects of the present disclosure.

FIG. 6 is a flowchart illustrating a method for autonomous vehicle test data distribution and analysis, according to aspects of the present disclosure. A method 600 of FIG. 6 begins at block 602, in which driving session data is uploaded from a computer of a drive site to a network attached storage of the drive site. For example, as described in FIG. 4, inserting the session data memory module 316 into the garage machine 370 triggers uploading of the session data from the garage machine 370 to the site NAS 380 of the origin site 402. At block 604, the driving session data is uploaded from the network attached storage of the drive site to a cloud-based storage location. For example, as shown in FIG. 4, uploading of the session data into the site NAS 380 triggers a message onto a session data queue, which is monitored by the site virtual machine 390. In response, the site virtual machine 390 uploads the session data from the origin site 402 (e.g., a drive site) data to a cloud-based storage location 430. In addition, the session data is removed from the origin site 402 (e.g., the garage machine 370 and/or the site NAS 380).

Referring again to FIG. 6, at block 606, the driving session data from the cloud-based storage location and a work unit are distributed to at least one research site separate from the drive site. For example, as shown in FIG. 4, The ingestion process 400 provides a test data distribution of relevant data from test autonomous vehicles to researcher locations for expedited use by the researchers. For example, test data distribution to a first research site 410 enables a researcher (or research site) to receive the session data as well as processing units. For example, the test data and processing unit distribution to a second research site 420 provides researchers with the test information, as well as processing units for contributing processing power to processing of the session data in response to the ingestion process 400.

At block 608, the driving session data is processed by the at least one research site according to an analysis/processing task associated by the work unit. For example, as shown in FIG. 4, processing (e.g., work) units may correspond with particular analysis or processing tasks. For example, the first research site 410 may be responsible for indexing the session data, making the session data compatible for keyword searching within the network attached storage of the second research site 420. Thus, an assigned work unit may be processing the session data for indexing. The second research site 420 may be responsible for performing machine learning tasks on the session data. Once the research site completes the work unit, the output is then pushed to the cloud-based storage location 430 as well as other research locations that may use the output, such as the data pipeline 440.

The method 600 also includes uploading the processed session data from the at least one research site to the cloud-based storage location. The method 600 further includes distributing the processed session data from the cloud-based storage location to at least another research site. The method 600 also includes completing a driving session of a test autonomous vehicle. The method 600 further includes removing a session data memory module from the test autonomous vehicle. The method 600 also includes storing the driving session data from the session data memory module to the computer of the drive site.

The method further includes monitoring, by a virtual machine of the drive site, a message queue associated with the network attached storage of the drive site. The method 600 also includes uploading, by the virtual machine of the drive site in response to the message queue, the driving session data from the network attached storage of the drive site to the cloud-based storage location. In the method 600, the work unit may include a performing machine learning on sensor data of the driving session data. In addition, the work unit may be the performing of a filtering operation of the driving session data.

Aspects of the present disclosure are directed to a system and method for monitoring the status of test data at various memory storage locations and running tasks on the test data. Aspects of the present disclosure provide a test data pipeline that distributes relevant data from test autonomous vehicles to researcher locations for expedited use by researchers.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an ASIC, a field-programmable gate array signal (FPGA) or other programmable logic device (PLD), discrete gate or transistor logic, discrete hardware components, or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM, flash memory, ROM, programmable read-only memory (PROM), EPROM, EEPROM, registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an ASIC with the processor, the bus interface, the user interface, supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media, including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for autonomous vehicle test data distribution and analysis, comprising:
   operating an autonomous test vehicle during a test run including another vehicle;
   uploading driving session test data from a computer of a drive site to a network attached storage of the drive site, in which the driving session test data comprises a drive log and measured telemetry information, captured sensor data, and selected vehicle control actions during the test run of the autonomous test vehicle;

uploading the driving session test data from the network attached storage of the drive site to a cloud-based storage location;
filtering the driving session test data from the cloud-based storage location according to a first work unit and a first processing unit assigned to a first research site, and a second work unit and a second processing unit assigned to a second research site;
distributing, through a data distribution pipeline, the filtered driving session test data and the first work unit and the first processing task to the first research site and the second work unit and the second processing task to the second research site, in which both the first research site and the second research site are geographically remote and separate from the drive site;
processing, by the first research site, the filtered driving session test data according to a processing task associated with the first work unit to output processed sensor data, the vehicle control actions, and a processed drive log and telemetry information to the data distribution pipeline using the first processing unit; and
autonomously verifying, by the second research site, the selected vehicle control actions according to a machine learning test verification task associated with the second work unit according to the processed sensor data and the processed drive log and telemetry information received from the data distribution pipeline using the second processing unit.

2. The method of claim 1, further comprises:
uploading the processed session data from the first research site to the cloud-based storage location; and
distributing the processed session data from the cloud-based storage location to the second research site.

3. The method of claim 1, further comprising:
completing a driving session of an autonomous test vehicle;
removing a session data memory module from the autonomous test vehicle; and
storing the driving session test data from the session data memory module to the computer of the drive site.

4. The method of claim 1, in which the uploading of the driving session test data from the network attached storage comprises:
monitoring, by a virtual machine of the drive site, a message queue associated with the network attached storage of the drive site; and
uploading, by the virtual machine of the drive site in response to the message queue, the driving session test data from the network attached storage of the drive site to the cloud-based storage location.

5. The method of claim 4, further comprising deleting, by the virtual machine of the drive site, the driving session test data from the network attached storage and/or the computer of the drive site.

6. The method of claim 1, in which a third work unit comprises a filtering operation of the driving session test data.

7. The method of claim 1, in which raw sensor test data from driving sensor data of the driving session test data is stored at the cloud-based storage location and filtering the raw sensor data of the first research site.

8. A non-transitory computer-readable medium storing instructions, the instructions comprising:
one or more instructions that when executed by one or more processors, cause the one or more processors to:
operate an autonomous test vehicle during a test run including another vehicle;
upload driving session test data from a computer of a drive site to a network attached storage of the drive site, in which the driving session test data comprises a drive log and measured telemetry information, captured sensor data, and selected vehicle control actions during the test run of the autonomous test vehicle;
upload the driving session test data from the network attached storage of the drive site to a cloud-based storage location;
filter the driving session test data from the cloud-based storage location according to a first work unit and a first processing unit assigned to a first research site, and a second work unit and a second processing unit assigned to a second research site;
distribute, through a data distribution pipeline, the filtered driving session test data and the first work unit and the first processing task to the first research site and the second work unit and the second processing task to the second research site, in which both the first research site and the second research site are geographically remote and separate from the drive site;
process, by the first research site, the filtered driving session test data according to a processing task associated with the first work unit to output processed sensor data, the selected vehicle control actions, and a processed drive log and telemetry information to the data distribution pipeline using the first processing unit; and
autonomously verifying, by the second research site, the selected vehicle control actions according to a machine learning test verification task associated with the second work unit according to the processed sensor data and the processed drive log and telemetry information received from the data distribution pipeline using the second processing unit.

9. The non-transitory computer-readable medium of claim 8, in which the one or more instructions, when executed by the one or more processors further cause the one or more processors to:
upload the processed session data from the first research site to the cloud-based storage location; and
distribute the processed session data from the cloud-based storage location to the second research site.

10. The non-transitory computer-readable medium of claim 8, in which the one or more instructions, when executed by the one or more processors further cause the one or more processors to:
complete a driving session of an autonomous test vehicle;
remove a session data memory module from the autonomous test vehicle; and
store the driving session test data from the session data memory module to the computer of the drive site.

11. The non-transitory computer-readable medium of claim 8, in which the one or more instructions that cause the one or more processors to upload the driving session test data from the network attached storage cause the one or more processors to:
monitor, by a virtual machine of the drive site, a message queue associated with the network attached storage of the drive site; and
upload, by the virtual machine of the drive site in response to the message queue, the driving session test data from the network attached storage of the drive site to the cloud-based storage location.

12. The non-transitory computer-readable medium of claim 11, in which the one or more instructions, when executed by the one or more processors further cause the one or more processors to delete, by the virtual machine of the drive site, the driving session test data from the network attached storage and/or the computer of the drive site.

13. A system for autonomous vehicle test data distribution and analysis, the system comprising:
- an autonomous test vehicle operable to perform a test run including another vehicle;
- a drive site comprising a network attached storage and a computer configured to upload driving session test data from the computer of the drive site to the network attached storage in response to insertion of a session data memory module of the autonomous test vehicle, the network attached storage configured to upload the driving session test data from the network attached storage of the drive site to a cloud-based storage location, in which the driving session test data comprises a drive log and measured telemetry information, captured sensor data, and selected vehicle control actions during the test run of the autonomous test vehicle;
- a data distribution pipeline configured to filter the driving session test data according to a first work unit and a first processing unit assigned to a first research site, and a second processing unit assigned to a second research site, and to distribute the filtered driving session test data and the first work unit and the first processing task to the first research site and the second work unit and the second processing task to the second research site, in which both the first research site and the second research site are geographically remote and separate from the drive site;
- the first research site configured to process the filtered driving session test data according to a processing task associated with the first work unit to output processed sensor data, the selected vehicle control actions, and a processed drive log and telemetry information to the data distribution pipeline using the first processing unit; and
- the second research site to autonomously verify the selected vehicle control actions according to a machine learning verification task associated with a second work unit according to the processed sensor data and the processed drive log telemetry information received from the data distribution pipeline using the second processing unit.

14. The system of claim 13, in which a third work unit comprises a filtering operation of the driving session test data.

15. The system of claim 13, in which raw sensor data from driving sensor data of the driving session test data is stored at the cloud-based storage location and filtering the raw sensor data of the first research site.

* * * * *